United States Patent
Abou Mahmoud et al.

(10) Patent No.: US 9,851,939 B2
(45) Date of Patent: *Dec. 26, 2017

(54) READING DEVICE USABILITY

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,920

(22) Filed: Jan. 26, 2017

(65) Prior Publication Data
US 2017/0131969 A1 May 11, 2017

Related U.S. Application Data

(63) Continuation of application No. 14/711,807, filed on May 14, 2015.

(51) Int. Cl.
*G06F 17/00* (2006.01)
*G06F 3/16* (2006.01)
(Continued)

(52) U.S. Cl.
CPC ............. *G06F 3/165* (2013.01); *G06F 3/013* (2013.01); *G10L 13/08* (2013.01)

(58) Field of Classification Search
CPC ......... H04L 51/04; H04L 51/02; H04L 51/24; H04L 67/306; H04L 12/585;
(Continued)

(56) References Cited

U.S. PATENT DOCUMENTS 7,769,039 B2   8/2010   Oral et al.
8,644,165 B2   2/2014   Saarimaki et al.
(Continued)

FOREIGN PATENT DOCUMENTS

EP   2608002 A1   6/2013

OTHER PUBLICATIONS

Abou Mahmoud et al., "Reading Device Usability", U.S. Appl. No. 14/711,807, filed May 14, 2015, 33 pages.
(Continued)

*Primary Examiner* — Marivelisse Santiago Cordero
*Assistant Examiner* — Stephen Brinich
(74) *Attorney, Agent, or Firm* — Gilbert Harmon, Jr.

(57) ABSTRACT

As disclosed herein a method, executed by a computer, for enabling enhanced reading device usability includes detecting, on an electronic device, a read operation that audibly reads visually presented information. The method further includes retrieving from a user profile a first threshold value and a second threshold value. The method further includes analyzing potential distractions to determine an estimated distraction level. The method further includes pausing the read operation if the estimated distraction level is greater than or equal to the first threshold value. The method further includes resuming the read operation if the estimated distraction level is less than or equal to the second threshold value. A computer system, and a computer program product corresponding to the method are also disclosed herein.

1 Claim, 4 Drawing Sheets

(51) Int. Cl.
*G10L 13/08* (2013.01)
*G06F 3/01* (2006.01)

(58) Field of Classification Search
CPC ..... H04L 12/587; H04L 12/589; H04L 51/12; H04L 51/18; H04L 65/403; H04L 67/30; G10L 15/26; G10L 21/00; G10L 21/06; G10L 25/48
USPC ...... 704/1–10, 235, 270, 260, 275, E15.043; 455/412.2
See application file for complete search history.

(56) References Cited

U.S. PATENT DOCUMENTS

| | | |
|---|---|---|
| 9,026,779 B2 | 5/2015 | Ewell, Jr. et al. |
| 9,196,239 B1 | 11/2015 | Taylor et al. |
| 9,471,275 B1 | 10/2016 | Abou Mahmoud et al. |
| 2003/0038754 A1 | 2/2003 | Goldstein et al. |
| 2003/0161302 A1 | 8/2003 | Zimmerman et al. |
| 2005/0030184 A1 | 2/2005 | Victor |
| 2006/0045280 A1 | 3/2006 | Boss et al. |
| 2006/0165379 A1 | 7/2006 | Agnihotri et al. |
| 2006/0190831 A1 | 8/2006 | Kelso et al. |
| 2006/0256133 A1 | 11/2006 | Rosenberg |
| 2010/0079508 A1 | 4/2010 | Hodge et al. |
| 2010/0312852 A1 | 12/2010 | Kamga et al. |
| 2011/0270948 A1 | 11/2011 | Zmuda |
| 2012/0079045 A1 | 3/2012 | Plotkin |
| 2012/0151055 A1 | 6/2012 | Kansal et al. |
| 2013/0117248 A1 | 5/2013 | Bhogal et al. |
| 2014/0028542 A1 | 1/2014 | Lovitt et al. |
| 2014/0098116 A1 | 4/2014 | Baldwin |
| 2014/0150002 A1 | 5/2014 | Hough et al. |
| 2014/0210702 A1 | 7/2014 | Peterson et al. |
| 2014/0237042 A1 | 8/2014 | Ahmed et al. |
| 2015/0112796 A1 | 4/2015 | Greenzeiger et al. |
| 2016/0103486 A1 | 4/2016 | Vertegaal et al. |
| 2016/0335044 A1 | 11/2016 | Abou Mahmoud et al. |

OTHER PUBLICATIONS

Abou Mahmoud et al., "Reading Device Usability", U.S. Appl. No. 15/415,932, filed Jan. 26, 2017, 29 pages.

IBM Appendix P, list of patents and patent applications treated as related, Jan. 26, 2017, 2 pages.

Disclosed Anonymously, "Method and system for capturing and reporting participant attention during web meetings", An IP.com Prior Art Database Technical Disclosure, IP.com No. 000233331, IP.com Electronic Publication: Dec. 6, 2013, pp. 1-3.

Sprint, "Motions and Gestures Settings—Samsung Galaxy S 5 User Guide", provided by inventor in main idea dated Mar. 11, 2015, <http://eguides.sprint.com/support/eguides/samsunggalaxys5/content/samsung_s_5_ug/motions_and_gestures_settings.html>.

Wikipedia, "Content-based image retrieval", from Wikipedia, the free encyclopedia, provided by inventor in main idea dated Mar. 11, 2015, pp. 1-10, This page was last modified Feb. 27, 2015, at 12:51,<http://en.wikipedia.org/wiki/Content-based_image_retrieval>.

| 310 PROFILE INFORMATION | | |
|---|---|---|
| 321 — Pause Reading Threshold | ▼ | 80 |
| 322 — Resume Reading Threshold | ▼ | 75 |
| CONTENT | DISTRACTION WEIGHT | |
| 323 — User Gaze | ▼ | 0 |
| 324 — Data Entry Activity | ▼ | 30 |
| 325 — Pointing Device Activity | ▼ | 20 |
| 326 — Messaging Activity | ▼ | 50 |
| 327 — Incoming Call | ▼ | 100 |
| 328 — Doorbell | ▼ | 80 |
| 329 — Voice Detection | ▼ | 50 |

| 330 Mobile Profile | | |
|---|---|---|
| 341 — Enable Moble | ● Yes  ○ No | |
| CONTENT | DISTRACTION WEIGHT | |
| 342 — Emergency Siren | ▼ | 100 |
| 343 — Heavy Traffic Alert | ▼ | 30 |
| 344 — Accident Alert | ▼ | 40 |
| 345 — Weather Advisory | ▼ | 20 |

READING DEVICE USABILITY

BACKGROUND

The present invention relates generally to electronic reading devices, and more particularly to the usability of electronic reading devices.

Screen readers convert information such as text displayed on an electronic device (e.g., smart phones, tablets, personal computers, laptop computers, e-readers and the like) to audible speech. Printed media (e.g., books, magazines, newspapers, etc.) is available to be digitally downloaded to electronic devices. An electronic book (e.g., e-book, digital book, or e-edition) is a book-length publication in digital form, consisting of text, images, or both, readable on computers or other electronic devices. E-books are becoming popular for recreation as well as educational uses. Many electronic devices provide text-to-speech capabilities enabling the electronic device to audibly read media such as e-books. Additionally, screen readers may be used by the visually impaired to conceptualize the contents being presented on the display of an electronic device.

SUMMARY

As disclosed herein a method, executed by a computer, includes detecting, on an electronic device, a read operation that audibly reads visually presented information. The method further includes retrieving from a user profile a first threshold value and a second threshold value. The method further includes analyzing potential distractions to determine an estimated distraction level. The method further includes pausing the read operation if the estimated distraction level is greater than or equal to the first threshold value. The method further includes resuming the read operation if the estimated distraction level is less than or equal to the second threshold value. A computer system, and a computer program product corresponding to the method are also disclosed herein.

DETAILED DESCRIPTION

Society has become increasingly dependent on electronic devices (e.g., smart phones, tablets, personal computers, laptop computers, e-readers and the like) for various aspects of day-to-day activities. Traditionally, electronic devices have been used to view email, e-books, webpages, stored document, recipes, and the like. With the advances in text-to-speech technology, many devices are now capable of audibly reading content that is visually presented to a user.

Electronic devices that read electronic content to a user (also called reading devices) are becoming more and more popular. Reading devices provide both a service and a convenience for users. As a service for the visually impaired, a screen reader may attempt to identify and interpret what is being displayed on the screen of an electronic device, and then audibly present the interpreted information to the user using text-to-speech technology. As a convenience, an individual may use a reading device to listen to digital media (e.g., a book, a newspaper article, or email) as the reading device reads the material to them.

If an individual is reading an actual paper book, and becomes distracted (e.g., the phone rings, they receive an instant message, the doorbell rings, or are otherwise diverted from reading), the individual may place a bookmark in the book to indicate where they stopped reading. Embodiments of the present invention recognize that conventional reading devices continue reading after the individual using the device has become distracted. For example, if an individual is using a reading device, and becomes distracted (e.g., the individuals attention becomes diverted when the phone rings, they receive an instant message, the doorbell rings, or someone starts talking to them), the reading device will continue to read even though the individual is no longer listening to the device. Additionally, if the individual is listening to a reading device in an automobile, and traffic becomes congested, or emergency sirens are detected, the user should pay full attention to the driving conditions and not pay attention to the reading device. However, the reading device will continue to read even though the individual may not be able to listen. When the individual is able to resume listening to the reading device, it may be very difficult to determine where to begin listening, since the reading device has continued to read while the individual was distracted. The embodiments disclosed herein generally address and solve the above-described problems.

Figure 1:
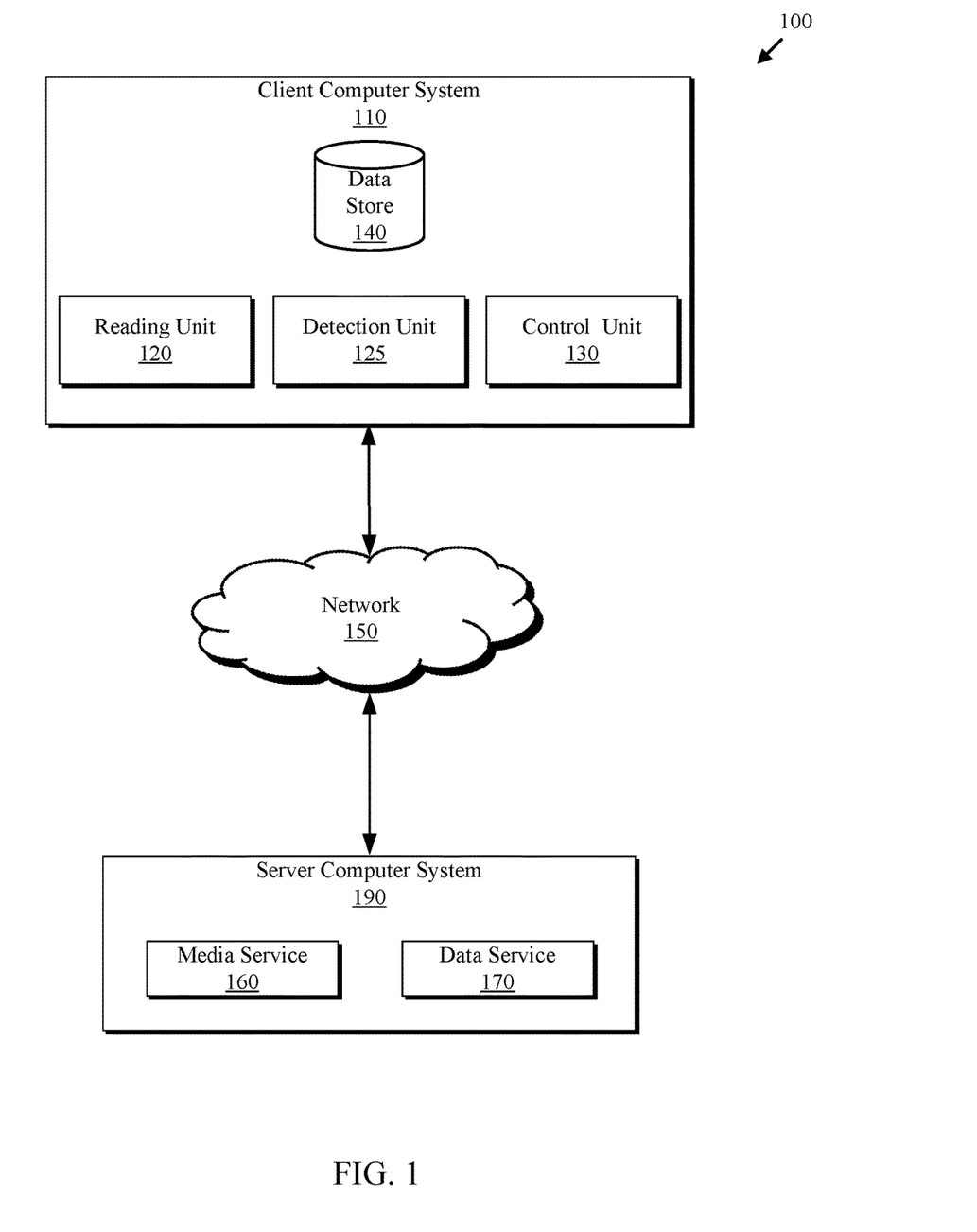
FIG. 1 is a functional block diagram depicting a computing environment in accordance with an embodiment of the present invention.

FIG. 1 is a functional block diagram depicting a computing environment 100 in accordance with an embodiment of the present invention. Computing environment 100 includes a client computer system 110 and a server computer system 190, which can be smart phones, tablets, desktop computers, laptop computers, specialized computer servers, or any other computer systems known in the art. In some embodiments, client computer system 110 and server computer system 190 represent computer systems utilizing clustered computers and components to act as a single pool of seamless resources when accessed through a network 150. In general, client computer system 110 and server computer system 190 are representative of any electronic devices, or combination of electronic devices, capable of executing machine-readable program instructions, as described in greater detail with regard to FIG. 4.

Client computer system 110 may include a reading unit 120, a detection unit 125, control unit 130, and a data store 140. Reading unit 120 may be configured to enable text-to-speech operations and audibly read any text being displayed on Client computer system 110. Detection unit 125 may be configured to detect potential distractions in the vicinity of a user. Detection unit 125 may interface with various I/O devices associated with the client computer system 110 such as a microphone, camera (e.g., a web cam), and the like. Detection unit 125 is depicted as a single module, however, it may be one or more modules configured to detect potential distractions. Detecting potential distractions may include receiving information from services currently running on client computer system 110 (e.g., gaze detection, sound detection, incoming messages, and the like). Additionally, detecting potential distractions may include receiving, via network 150, information (e.g., Global Positioning System (GPS) location, traffic conditions, weather advisory, and the like) from services running on a server computer, such as, server computer system 190 or on another device (not shown) connected over network 150. Control unit 130 may be configured to receive, from detection unit 125, information corresponding to potential distractions and determine if the operation of reading unit 120 should be altered (e.g., slowed down, stopped, or restarted). A more detailed description of controlling a reading device, as executed by one embodiment of control unit 130, is included with respect to FIG. 2.

Figure 2:
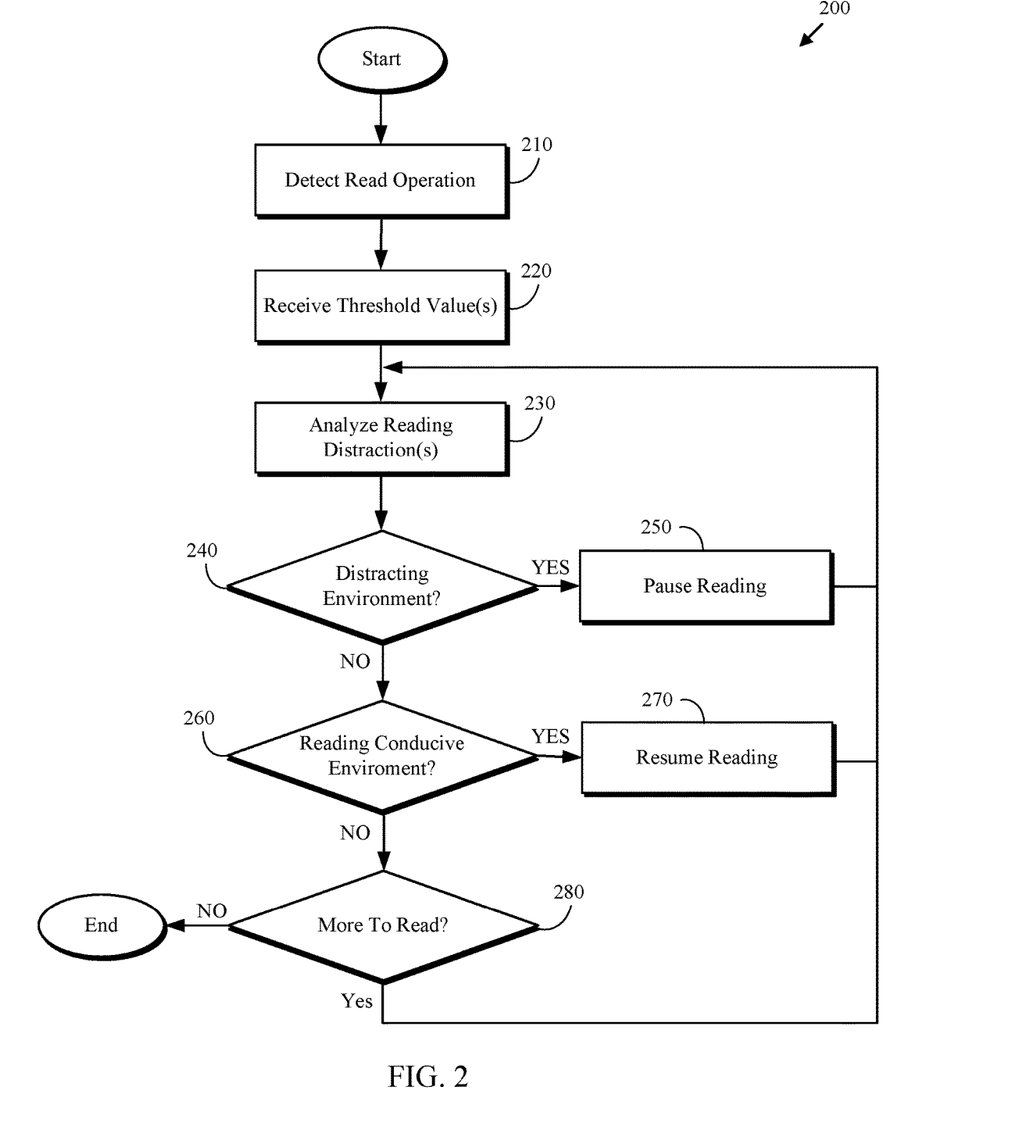
FIG. 2 is a flowchart depicting a reading device control method, in accordance with an embodiment of the present invention.
Figure 3:
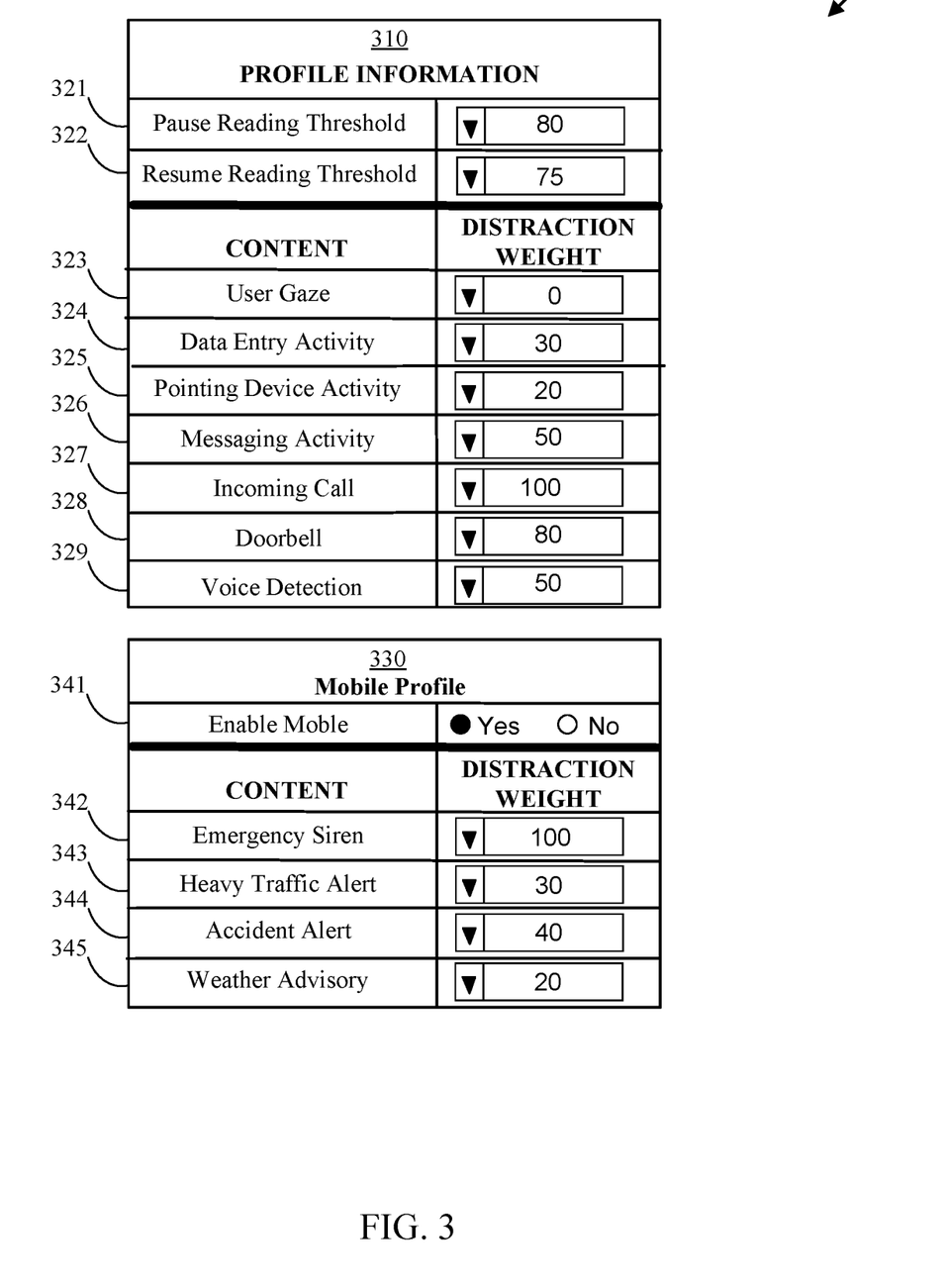
FIG. 3 depicts an example of profile information corresponding to the reading device control method, in accordance with an embodiment of the present invention.

Data store 140 may store digital media (e.g., books, email, word processor documents, and the like). Additionally, data store 140 may store profile information (e.g., as depicted in FIG. 3) corresponding to a reading device control method (e.g., as depicted in FIG. 2). Data store 140 may be any non-volatile storage media known in the art. For example, data store 140 can be implemented with a tape library, optical library, one or more independent hard disk drives, or multiple hard disk drives in a redundant array of independent disks (RAID). Similarly, data on data store 140 may conform to any suitable storage architecture known in the art, such as a file, a relational database, an object-oriented database, and/or one or more tables.

As depicted, server computer system 190 includes a media service 160 and a data service 170. Although depicted as a single service, media service 160 may be one or more services for providing digital media. Included in the one or more services may be an electronic book service (e.g., electronic copies of printed books), an email service, or a social media website. The digital media may be remotely accessed via network 150, and may be stored on data store 140. Data service 170 may provide detection unit 125 with details identifying a potential distraction. As depicted, data service 170 is a single service, however, data service 170 may be one or more services providing, for example, but not limited to, GPS coordinates, traffic information, or weather information.

Network 150 can be, for example, a local area network (LAN), a wide area network (WAN) such as the Internet, or a combination of the two, and include wired, wireless, or fiber optic connections. In general, network 150 can be any combination of connections and protocols that will support communications between server computer system 190 and client computer system 110 in accordance with an embodiment of the present invention.

FIG. 2 is a flowchart depicting a reading device control method 200, in accordance with an embodiment of the present invention. As depicted, reading device control method 200 includes detecting (210) a read operation, receiving (220) threshold values, analyzing (230) reading distractions, determining (240) whether the environment is distracting, pausing (250) reading, determining (260) whether the environment is conducive to reading, resuming (270) reading, and determining (280) whether there is more to read. Reading device control method 200 enables a reading device to react to potential distractions that may cause the user to become distracted.

Detecting (210) a read operation may include control unit 130 receiving an indication that a reading unit, such as reading unit 120, is conducting a read operation. In some embodiments, control unit 130 uses system commands to detect when reading unit 120 is conducting a read operation. In other embodiments, reading unit 120 produces a signal (e.g., electronic indicator or electronic message) when reading unit 120 is actively reading. For example, control unit 130 may detect an active read operation by detecting or receiving the signal (not shown) produced by reading unit 120.

Receiving (220) threshold values may include control unit 130 receiving a first threshold value and a second threshold value that may be retrieved from a user profile corresponding to control unit 130. A more detailed description of an example of a user profile is included with respect to FIG. 3. The first threshold value may indicate an estimated distraction level at which control unit 130 pauses reading unit 120. The second threshold value may indicate an estimated distraction level at which control unit 130 allows reading unit 120 to resume reading. In some embodiments, the estimated distraction level is computed by accumulating a set of numerical weighted values, corresponding to potential reading distractions. Crossing the first and second threshold values may cause control unit 130 to take an action (e.g., pausing or resuming the reading operation). In other embodiments, the estimated distraction level is computed by counting a total number of concurrent potential distractions. A change in the number of distractions may cause control unit 130 to take an action (e.g., 3 or more distractions causes reading to pause, and less than 2 distractions causes reading to resume).

Analyzing (230) reading distractions may include control unit 130 receiving a list of potential distractions that may be retrieved from a user profile. The list of potential distractions may include, but is not limited to, data entry activity, messaging activity, voice detection, and the like. Using the list of potential distractions, control unit 130 may assess the user's environment to determine if any of the distractions included in the list of potential distractions have occurred. In some embodiments, control unit 130 receives information identifying a potential distraction within the user's environment from one or more services running on the local device (e.g., detection unit 125). In other embodiments, control unit 130 receives information identifying a potential distraction within the user's environment from one or more services provided by a remote server (e.g., data service 170). In another embodiment, each distraction in the list of potential distractions includes a corresponding numerical weight. In this embodiment, control unit 130 accumulates the numerical weights corresponding to potential distractions identified within the environment, and thereby provides an estimated distraction level.

Determining (240) whether the environment is distracting may include control unit 130 comparing the first distraction value with an estimated distraction level. If the estimated distraction level is greater than or equal to the first distraction value, then reading device control method 200 proceeds to pausing (250) reading. Otherwise, reading device control method 200 proceeds to determining (260) whether the environment is conducive to reading.

Pausing (250) reading may include control unit 130 requesting that reading unit 120 pause (e.g., stop or halt) the reading operation. In some embodiments, control unit 130 pauses reading unit 120 and also identifies the last location in the text processed by reading unit 120. In other embodiments, control unit 130 causes reading unit 120 to slow the reading pace to accommodate a distraction (e.g., keyboard activity, and/or mouse activity) and if the estimated distraction level persists or increases in value, the reading operation will be paused (e.g. halted).

Determining (260) whether the environment is conducive to reading may include control unit 130 comparing the second distraction value with an estimated distraction level. If the estimated distraction level is less than or equal to the second distraction value, then reading device control method 200 proceeds to resuming (270) reading. Otherwise, reading device control method 200 proceeds to determining (280) whether there is more to read.

Resuming (270) reading may include control unit 130 requesting that reading unit 120 resume the reading operation. In some embodiments, the read operation resumes in the exact location that reading was paused. In other embodiments, the last location in the text to be read has been preserved, however, the reading operation automatically moves back one minute to account for the possibility that the user may have been distracted before control unit 130 detected and reacted to the estimated distraction level. In yet another embodiment, the last location in the text is not preserved, and the reading operation resumes at the beginning of most recent unit of reading (e.g., the beginning of an email, the beginning of a page of a book or document, and the like).

Determining (280) whether there is more to read may include control unit 130 detecting if reading unit 120 is still active and attempting to perform a reading operation. In some embodiments, reading unit 120 is a screen reading application that continuously describes a computer screen to a visually impaired user, and is continually running. In other embodiments, reading unit 120 is an e-book reader, and is configured to read a portion of the e-book for a configurable duration and then stop. When the reading duration has elapsed, reading unit 120 may indicate there is nothing more to read.

FIG. 3 depicts example profile information 300, in accordance with an embodiment of the present invention. FIG. 3 provides only an illustration of one example and does not imply any limitations with regard to different potential distractions that may be included in other embodiments. In the depicted example, profile information 300 includes an example of local profile 310 and mobile profile extension 330. Local profile 310 comprises potential local distractions that may be present in the current listening environment of the user. The local environment may be defined as the user's immediate surroundings, for example, at the office, in the home, sitting in a park, sitting in a café, or any location that a user may listen to a reading device.

In the depicted example, local profile 310 and mobile profile extension 330 comprise configuration elements 321-329 and 341-345, respectively. Using the depicted configuration elements, potential distractions are assigned a numerical weight within the range 0-100, with zero indicating no importance, and 100 indicating the potential distraction is very important. If control unit 130 detects (i.e., identifies) a potential distraction in the user's environment, the numerical weight corresponding to the distraction is accumulated producing an estimated distraction level. When the estimated distraction level reaches a configured threshold, control unit 130 may take actions to either pause or resume the operation of a reading application (e.g. reading unit 120).

Configuration element 321 allows configuration of a pause-reading threshold (i.e., a first threshold) configuration item. Control unit 130 may pause a reading application (e.g. reading unit 120) if the estimated distraction level is greater than or equal to the value corresponding to the pause-reading threshold as identified in configuration element 321. Configuration element 322 allows configuration of a resume-reading threshold (i.e., second threshold) configuration item. A reading application (e.g. reading unit 120) may be enabled to resume reading by control unit 130 if the estimated distraction level is less than or equal to the value corresponding to the resume-reading threshold as identified in element 322.

In some embodiments, the pause-reading threshold is greater than the resume-reading threshold. In other embodiments, the pause-reading threshold and the resume-reading threshold are represented by a single configuration value. Configuration elements 323-329 enable the user to assign a numerical weight to each of the potential distractions identified in the user profile. Following is a description of configuration elements 323-329.

Configuration element 323 enables the user to indicate a numerical weight corresponding to a user gaze configuration item. User gaze may be defined as detecting where the user's eyes are focused (e.g., where the user is looking). If detection unit 125 determines that the user is not focused on the display or monitor of the reading device, then the numerical weight corresponding to the gaze configuration item is included in the estimated distraction level. In the current example, the numerical weight corresponding to the user gaze configuration item is zero, indicating that the user does not want the focus of the user's eyes to have an effect on the estimated distraction level.

Configuration element 324 enables the user to indicate a numerical weight corresponding to a data entry activity configuration item. Data entry activity may include using a physical keyboard or virtual keyboard to provide input to the electronic device performing the reading operation. If detection unit 125 determines that the user is performing a data entry activity, then the numerical weight corresponding to the data entry activity configuration item is included in the estimated distraction level. In the current example, the numerical weight corresponding to the data entry activity configuration item is 30.

Configuration element 325 enables the user to indicate a numerical weight corresponding to a pointing device activity configuration item. Pointing device activity may include using a mouse, track ball, touchpad, touch screen, or the like to move a pointer (or cursor). If detection unit 125 determines that the user is using a pointing device, then the numerical weight corresponding to the pointing device activity configuration item is included in the estimated distraction level. In the current example, the numerical weight corresponding to the pointing device activity configuration item is 20.

Configuration element 326 enables the user to indicate a numerical weight corresponding to a messaging activity configuration item. Messaging activity may include the electronic device (e.g., client computer system 110) receiving some form of electronic message. The message may be an instant message, a test message, a voicemail, a pager alert, or the like and may be presented as a popup window, included in an existing window, or some other method of presentation. If detection unit 125 detects messaging activity, then the numerical weight corresponding to the messaging activity configuration item is included in the estimated distraction level. In the current example, the numerical weight corresponding to the messaging activity configuration item is 50.

Configuration element 327 enables the user to indicate a numerical weight corresponding to an incoming call configuration item. An incoming call may include receiving a call via land-line, cell phone, smart phone, tablet, personal computer, or any other device capable of receiving an incoming call. The call may be a traditional phone call, a wireless phone call, a video call using peer-to-peer computer connections, and the like. If detection unit 125 detects an incoming call, then the numerical weight corresponding to the incoming call configuration item is included in the estimated distraction level. In the current example, the numerical weight corresponding to an incoming call configuration item is 100, indicating that the user feels an incoming call is a major distraction, and should immediately push the estimated distraction level above the pause-reading threshold (as defined by configuration element 321).

Configuration element 328 enables the user to indicate a numerical weight corresponding to a doorbell configuration item. A doorbell may be a signaling device placed near an entry door used by a visitor to alert the occupant of the visitor's presence. A doorbell may include an electronic sound, a metal on metal knocking sound, a hand knocking on the door sound, and the like. If detection unit 125 detects a doorbell, then the numerical weight corresponding to the doorbell configuration item is included in the estimated distraction level. In the current example, the numerical weight corresponding to the doorbell configuration item is 80.

Configuration element 329 enables the user to indicate a numerical weight corresponding to a voice detection configuration item. Voice detection may include an individual speaking directly to the user, a discussion between two or more individuals in near proximity to the user, or any other voice disturbances in near proximity to the user. If detection unit 125 detects voices, then the numerical weight corresponding to the voice detection configuration item is included in the estimated distraction level. In the current example, the numerical weight corresponding to the voice detection configuration item is 50.

Mobile profile extension 330 comprises potential mobile distractions that may be present when the user is mobile (e.g., driving an automobile, riding a train, walking, and the like). Configuration element 341 allows the user to enable or disable the inclusion a selectable mobile profile extension comprising configuration items corresponding to mobile profile extension 330 within the profile.

Configuration element 342 enables the user to indicate a numerical weight corresponding to an emergency siren configuration item. An emergency siren may include any siren associated with an emergency vehicle, such as, but not limited to a police car, a fire truck, an ambulance, or a park ranger. If detection unit 125 or some other service (e.g., data service 170) detects an emergency siren, then the numerical weight corresponding to the emergency siren configuration item is included in the estimated distraction level. In the current example, the numerical weight corresponding to an emergency siren configuration item is 100, indicating that the user feels an emergency siren is a major distraction, and should immediately push the estimated distraction level above the pause-reading threshold (as defined by configuration element 321).

Configuration element 343 enables the user to indicate a numerical weight corresponding to a heavy traffic alert configuration item. A heavy traffic alert may include a GPS warning that there is heavy traffic along your intended path of travel, an emergency warning transmitted over radio frequencies, internet mapping services, or the like. If detection unit 125 or some other service (e.g., data service 170) detects a heavy traffic alert, then the numerical weight corresponding to the heavy traffic alert configuration item is included in the estimated distraction level. In the current example, the numerical weight corresponding to an emergency siren configuration item is 30.

Configuration element 344 enables the user to indicate a numerical weight corresponding to an accident alert configuration item. An accident alert may indicate there is an accident within a mile of the user's current location. An accident alert may be received from services such as an emergency warning transmitted over radio frequencies, internet mapping services, or the like. If detection unit 125 or some other service (e.g., data service 170) detects an accident alert, then the numerical weight corresponding to the accident alert configuration item is included in the estimated distraction level. In the current example, the numerical weight corresponding to an emergency siren configuration item is 40.

Configuration element 345 enables the user to indicate a numerical weight corresponding to a weather advisory configuration item. A weather advisory may warn the user of potentially dangerous weather (e.g., a tornado, freezing rain, heavy snow, heavy rain, and the like) near the user's current location. A weather advisory may be received from services such as the National Weather Service, internet weather sites, local radio stations, and the like. If detection unit 125 or some other service (e.g., data service 170) detects a weather advisory, then the numerical weight corresponding to the weather advisory configuration item is included in the estimated distraction level. In the current example, the numerical weight corresponding to an emergency siren configuration item is 40.

The current example presents a single profile. In other embodiments, the user may have multiple profiles for various environments. For example, the user may have unique profiles for the office, traveling on the bus, driving a car, and sitting in a café. In another embodiment, control unit 130 senses the current environment of the device and automatically selects an available profile that is appropriate for the environment. In some other embodiment, control unit 130 detects a change in environment and prompts the user to determine if a profile change is required. In yet another embodiment, control unit 130 delays the presentation of messages and popups by enabling a do-not-disturb profile setting.

Figure 4:
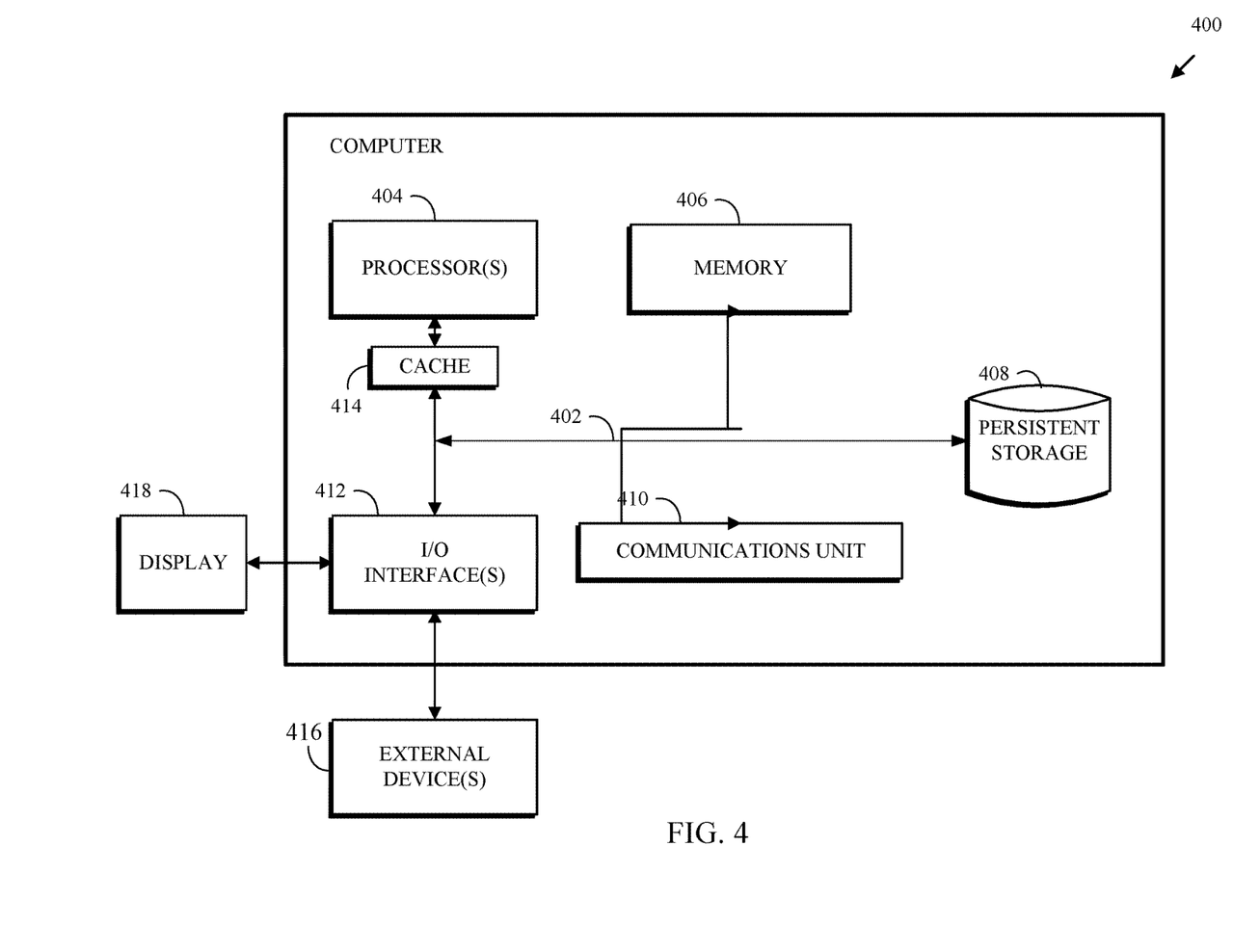
FIG. 4 is a block diagram depicting various components of one embodiment of a computer suitable for executing the methods disclosed herein.

FIG. 4 depicts a block diagram of components of a computer system 400, which is an example of a system such as client computer system 110 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computer system 110 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., data store 140, reading device control method 200, and profile information 300, are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources client computer system 110. In these examples, communications unit 410 includes one or more network interface cards. Communications unit 410 may provide communications through the use of either or both physical and wireless communications links. Program instructions and data used to practice embodiments of data store 140, reading device control method 200, and profile information 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more computer readable storage media and program instructions stored on the one or more computer readable storage media, the program instructions comprising instructions to:
detect, on an electronic device, a read operation that audibly reads visually presented information, wherein the read operation is detected using system commands;
retrieve from a user profile a first user-defined threshold value and a second user-defined threshold value, wherein the first user-defined threshold value identifies an estimated distraction level at which the read operation is paused and the second user-defined threshold value identifies the estimated distraction level at which the read operation is resumed, and wherein the first user-defined threshold value is greater than the second user-defined threshold value, and wherein the user profile comprises a list of one or more local distractions, the one or more local distractions each comprising a user-defined numerical weight, and wherein the user profile comprises a selectable mobile profile extension, the selectable mobile profile extension providing a list of one or more mobile distractions each comprising a user-defined numerical weight;
analyze local and mobile distractions to determine the estimated distraction level, wherein analyzing the local and mobile distractions comprises assessing the user's environment to detect if any of the distractions included in the list of local distractions and the list of mobile distractions have occurred, and wherein determining the estimated distraction level comprises accumulating the numerical weight corresponding to the one or more local distractions and the one or more mobile distractions that are detected;
determine if the estimated distraction level is greater than or equal to the first threshold value;
pause the read operation responsive to determining the estimated distraction level is greater than or equal to the first threshold value, wherein pausing the read operation comprises halting the read operation and identifying a location in the visually presented information where the read operation was halted;
determine if the estimated distraction level is less than or equal to the second threshold value; and
resume the read operation, responsive to determining the estimated distraction level is less than or equal to the second threshold value, wherein resuming the read operation comprises starting the read operation beginning at the location in the visually presented information where the read operation was halted.

* * * * *